United States Patent [19]

Morasch

[11] Patent Number: 5,523,102
[45] Date of Patent: Jun. 4, 1996

[54] METHOD OF IMPROVING THE FIRMNESS OF FISH TISSUE

[76] Inventor: Alan K. Morasch, 3606 SE. 151st Ct., Vancouver, Wash. 98684-5305

[21] Appl. No.: 398,535

[22] Filed: Mar. 6, 1995

[51] Int. Cl.⁶ ..................................................... A23L 1/325
[52] U.S. Cl. .......................................... 426/296; 426/643
[58] Field of Search .............................. 426/92, 96, 643, 426/289, 296, 520

[56] References Cited

U.S. PATENT DOCUMENTS

| | | | |
|---|---|---|---|
| 4,199,603 | 4/1980 | Sortwell | 426/92 |
| 4,303,685 | 12/1981 | Katoh et al. | 426/332 |
| 4,407,831 | 10/1983 | Swartz | 426/281 |
| 4,411,917 | 10/1983 | Chang | 426/643 X |
| 4,517,208 | 5/1985 | Crawford | 426/332 |
| 5,256,433 | 10/1993 | Nakamura et al. | 426/289 |
| 5,266,340 | 11/1993 | Samson et al. | 426/92 |

FOREIGN PATENT DOCUMENTS 1-101866  4/1989  Japan .................................. 426/296

*Primary Examiner*—Arthur L. Corbin
*Attorney, Agent, or Firm*—Stoel Rives

[57] ABSTRACT

The invention provides significantly firmer and more desirable end-product texture for soft tissue fish species, especially those affected by protease enzymes. Fresh or frozen fish fillets, steaks, and substantially intact pieces of fish tissue are pretreated with phosphates or similar salts and powdered binding materials, such as whey proteins, high-protein dairy derivatives, known proteins, starches, and gelatinous or carbohydrate hydrocolloid-type binding materials. The fish is then subjected to a direct-contact heat treatment on a surface at a high temperature (145°–400° C.). The texture of normally firmer fish species may also be improved by this method.

24 Claims, No Drawings

METHOD OF IMPROVING THE FIRMNESS OF FISH TISSUE

TECHNICAL FIELD

The present invention relates to fish products and, in particular, to methods for structurally firming large pieces of soft tissue textured fish.

BACKGROUND OF THE INVENTION

Populations of fish species desirable for human consumption are continuing to decline. However, soft tissue textured fish, such as Arrowtooth Flounder, Pacific Dover Sole, Pacific Sand Dab, Pacific Mackerel, Pacific Whiting or Hake, English Sole, Argentine Whiting, Chilean Whiting, Atlantic Whiting, Peruvian Whiting, and some species of Salmon, are highly abundant, but possess few viable commercial applications. The background is presented herein only by way of example to whiting. Whiting is vastly abundant worldwide, has few commercial uses except for Surimi, must be handled carefully due to its soft texture, and is susceptible to protease tissue disintegration.

Whiting and other fish are commercially undervalued and underused because the texture of their tissue is inherently soft, their tissue becomes soft before it can be processed and consumed, or the tissue tends undesirably to flake apart into small pieces. Fish tissue exhibiting softness is typically so weak that it disintegrates easily, even when the fish are handled delicately and cooked immediately by conventional methods.

Conventional cooking methods, including steaming, microwaving, frying, boiling, and baking, do not achieve significant tissue texture improvement even though certain conventional cooking procedures may inactivate some protease and other enzymes thought to cause softening. For example, the moisture-intensive cooking procedures tend to cause tissue disintegration while conventional dry heat cooking methods, such as grilling and baking, transfer the heat too slowly to inactivate enzymes and prevent internal tissue softening.

Several materials, such as egg white, potato starch, and beef plasma protein, are known to inhibit tissue-softening protease enzymes. The effectiveness of these treatments for controlling fish tissue softening is, however, limited because the protease and other enzymes are present throughout the fish tissue. Standard immersion and other surface treatment procedures do not effectively penetrate the deeper tissues, so internal tissue softening continues. Even if a protease inhibitor could be distributed throughout the fish tissue, some softening would still occur during conventional cooking procedures. For example, protease inhibitors may not affect all biochemical factors that contribute to softening. Furthermore, enzyme inhibition will not restore the original tissue texture to tissue that has already softened, i.e., the softening is irreversible. Some fish species inherently have weakly bound tissue that disintegrates regardless of the inactivation of protease enzymes.

U.S. Pat. No. 4,407,831 of Swartz describes a method for nutritionally fortifying fish tissue with protein by injection with water soluble soy, milk, and particularly whey protein derivatives. The patent also describes a phosphate pretreatment to minimize drip losses. The patent does not disclose or suggest tissue firming methods.

SUMMARY OF THE INVENTION

An object of the present invention is, therefore, to provide a method for firming the tissue texture of a number of widely distributed fish species characteristically having very soft tissue texture.

The invention provides significantly firmer and more desirable end-product texture for soft tissue fish species, especially for fish that are affected with protease enzymes, by coating the fish with powdered food-based tissue binding materials such as whey proteins, other high-protein dairy ingredients and known proteins, starches, and gelatinous or carbohydrate hydrocolloid-type binding materials. The fish is then heated by direct contact with a flat surface heated to a high temperature (145°–400°C.). The texture of normally firmer fish species may also be improved by this method. The tissue texture firming process may be enhanced by pretreatment with phosphates or similar salts.

Additional objects and advantages of the present invention will be apparent from the following detailed description of preferred embodiments thereof.

DETAILED DESCRIPTION OF PREFERRED EMBODIMENTS

Soft textured fish processed in accordance with the present invention include fish species whose tissue is inherently weakly bound, prone to disintegration by protease enzymes, or subject to other undesirable softening factors. Species of soft textured fish include, but are not limited to, Arrowtooth Flounder, Pacific Dover Sole, Pacific Sand Dab, Pacific Mackerel, Pacific Whiting or Hake, English Sole, Argentine Whiting, Chilean Whiting, Atlantic Whiting, Peruvian Whiting, and some species of salmon.

The soft textured fish are preferably handled delicately and treated by the process of the present invention as soon as possible after they are caught. Alternatively, the fish tissue may be frozen when fresh and treated after thawing. The fish tissue is preferably divided into steaks or fillets, but substantially intact pieces of fish tissue having all dimensions greater than about 6 mm may also be treated according to the present invention.

The present invention entails a pretreatment of the fish tissue and a direct-contact heating treatment to enhance the tissue texture and eating quality of soft tissue-textured fish. For example, food-based tissue binding materials such as whey proteins, other high-protein dairy ingredients, and known protein, starch, gelatinous, and carbohydrate hydrocolloid-type binding materials are employed to increase the structural integrity of the fish tissue, especially the open area between the flakes, and essentially glue the fish tissue together into a firm mass. These substances also cooperate with the direct heating treatment to form a crisp surface coating of varying thickness. The coating seals the surface of the fish tissue for further protection during refrigeration, freezing, or cooking. For example, the coating prevents excessive soaking of preapplied sauces into the fish tissue during storage and subsequent cooking of the fish tissue.

These binding materials are preferably applied in the form of dry powder, especially because many of them are not generally water soluble or are difficult to hydrate. The powdered binding materials may also yield better and firmer tissue texture because the powdered components are sufficiently large to have higher cohesive properties than perhaps their soluble equivalents, but are still sufficiently small to penetrate the fish tissue. Even though immersion or injection with solutions containing these binding substances may alternatively or additionally be employed, dusting the fish tissue with dry powdered binding materials is also preferred because it is most compatible with available commercial production line machinery methods.

A complementary alternative pretreatment may include presoaking the fish tissue in a phosphate salt solution. Treating raw tissues and proteins by certain phosphate salts is common practice in the food industry. These salts react with proteins to increase their water binding ability.

The fish tissue is preferably immersed in the phosphate solution. Alternatively, the phosphate solution may be injected into the fish tissue. The phosphate pretreatment cooperates with the direct contact heating treatment to permit greater water retention without undesirable tissue softening during cooking to provide a smoother tissue texture that is more desirable for eating. The water retention is evidenced by greater weight after heating according to the present invention. The phosphate pretreatment preferably precedes the binding material treatment.

Skilled persons will appreciate that numerous alternative or additional pretreatments are possible. For example, the fish tissue could be treated with aqueous or powdered casein, carrageenan with a precipatory calcium salt, other gelling gums, or dilute albumen. Skilled persons will also appreciate that the fish tissue may be subjected to vacuum massaging at a slow speed (1–2 rpm) or to other techniques to load the internal fish tissue with pretreatment solutions. These techniques can cause the raw fish tissue to absorb about 15–25% of its weight in pretreatment solutions.

The fish tissue is preferably heated by direct contact with a flat surface at a high temperature. Stainless steel is the most preferred heating surface because it does not oxidize or rust and can easily be cleaned and sanitized to meet food preparation standards. Other high-temperature conductive materials, such as other metals, may be employed. Teflon® or other non-stick surfaces or a thin coating of oil, monoglyceride spray, or other release agents may be applied to the heated surface to prevent the fish tissue from sticking and permit easy release of the fish tissue from the heated surface.

Preferably, both sides of the fish are brought into contact with the heated surface. The fish tissue may be flipped from its first side to its second side with a spatula. Stationary top and bottom, parallel, press-like hot plates or mobil top and bottom, parallel, continuous, conveyor-like plates are preferred for high volume production to achieve simultaneous two-sided heating. Alternatively, one side of the fish tissue could travel on a single metal plate and then be mechanically inverted to heat its second side. The treatment of fish tissue inversely balances the heating time with the heating temperature. An effective temperature range is about 145°–400° C., and most preferably about 175°–300° C. Gas burners, electric coils or other direct or indirect thermal sources may be employed to provide the heat. The preferred heating time ranges between 40 seconds and two minutes per side of fish tissue.

Directly heating the pretreated fish tissue not only inactivates protease enzymes and other biochemical softening processes, but also forces the binding materials into the fish tissue and coagulates it into a permanently firm, rigid mass. The fish may then be refrigerated or frozen for later cooking without losing its firm texture.

EXAMPLE 1

Fresh and frozen/thawed fillets (preferably 6–25 mm thick) of Pacific Whiting fish tissue were immersed in an aqueous solution of 3% sodium tripolyphosphate (STPP) by weight for 12 minutes, laid on a drying rack made of finely meshed metal, and dusted on both sides with a whey protein concentrate (WPC) powder. The fish tissue may be soaked in STPP for 30 seconds to fifteen minutes, but less than ten minutes is preferred. STPP is available from a number of suppliers; however, the STPP used in this example was food grade and was acquired from FMC Corporation. Skilled persons will appreciate that other alkaline phosphate salts may be partly or completely substituted for the STPP and that the phosphate solution is preferably selected from a concentration range of 1–15% by weight.

WPC contains about 83.3% protein, 5.9% ash, 4.0% moisture, 4.6% fat, and 4.5% lactose. WPC is available from a number of dairy product manufacturers; however, the WPC used in this example was Alacen 882™, sold by New Zealand Milk Products. The pretreatments generally increased the weight of the fillets by 15–25%.

The pretreated fillets were heated on a lightly greased flat grill at a surface temperature of 180° C. for about one minute on each side. The fillets became desirably firm, generally retained their pretreatment shapes, and had a desirable eating texture. Similarly treated fillets heated by conventional methods, such as baking, boiling, microwaving, and steaming fell apart or disintegrated and had an undesirable eating texture. Furthermore, untreated fillets that were heated by direct-contact heating also fell apart or disintegrated and had undesirable eating texture.

The fillets were covered with an enchilada sauce, stored in closed plastic bags, and refrigerated for three days. The fillets maintained their firm texture and flaked desirably when cut, indicating that the heat treatment was adequate to thermally inactivate the protease enzymes that soften fish tissue. The length and width of the fillets treated were limited only by the size of the cooking equipment (about a meter wide).

Fish tissue destined for freezing, thawing, cooking, and perhaps even steam table warming, was grilled for only about 40 seconds on each side. This shorter heat treatment inactivated the protease enzymes and firmed the fish tissue, but left it slightly undercooked in view of later cooking.

EXAMPLE 2

Fresh and frozen/thawed whiting was pretreated and heated as described in Example 1. The tissue was firm. Some of the whiting was chopped into pieces smaller than 6.5 mm cubes. The cubes were blended with an enchilada sauce and stored in a refrigerator or a freezer for further testing. After being thawed and reheated, the cubes maintained a firm, palatable texture and flaked desirably when cut.

EXAMPLE 3

Fresh and frozen/thawed whiting fillets were pretreated and heated as described in Example 1. The tissue was firm. The whiting fillets were coated with Splash French Herbs Cooking Sauce™, stored in plastic bags, and frozen for three months. After being thawed and reheated, the fillets had nice appearance and a firm, palatable texture.

EXAMPLE 4

Fillets of Arrowhead flounder were soaked in STPP and grilled as described in Example 1, but at about 175° C. Flounder fillets are much thicker than those from whiting and require a longer cooking time. Thus, the cooking temperature was reduced to avoid overcooking and excessively darkening the surface of the fish tissue. The treated fillets had a firm tissue texture and maintained their original shape.

EXAMPLE 5

Several fillets of Pacific Whiting fish tissue, previously frozen, were completely coated with a sodium caseinate powder. The coated fillets were grilled as described for Example 1, but at 205° C. The treated fillets had a firm tissue texture and maintained their original shape.

EXAMPLE 6

Fillets of Pacific Whiting tissue were treated with an aqueous solution of 3% STPP for 10 minutes. They were drained and then entirely coated with WPC powder as described in Example 1.

The treated fillets were then heated on both sides simultaneously by a Belt Grill machine manufactured by Alfa DeLaval. The Belt Grill employs opposing, top and bottom metallic heating plates. The product was heated as it was moved by opposing, top and bottom continuous Teflon® belts that provide a low friction, anti-sticking separation between the product and the heating plates. The heating plates were maintained at a temperature of about 205° C., and the fillets were moved between the plates for about 110 to 130 seconds. The fillets exhibited a very firm texture and maintained their shape.

The fillets were frozen, thawed after two weeks, heated for eating, and evaluated for texture. The firm tissue texture of cooked fillets was not altered by the freezing process.

The preferred process entails 1) an immersion or vacuum soaking treatment of the fillets in STPP or other phosphate salt to provide the fish with low drip losses; 2) a WPC and/or casein treatment to enable tissue firming and gluing during the heating treatment; 3) optional pH adjustments, preferably employing phosphates, salts, etc., to optimize the STPP and WPC treatments; and 4) a direct-contact, high-temperature, heat treatment to achieve firm fish tissue texture. The preferred process is rapid, simple, and cost effective and reduces drip loss and shrinkage, as well as increases firmness.

Skilled persons will appreciate that in addition to improving the structural integrity of soft textured fish, the treatments of the present invention may be employed to improve the quality of conventionally harvested fish and certain restructured fish applications. This improvement in tissue texture has great commercial value.

It will be obvious to those having skill in the art that various changes may be made in the details of the above-described embodiments of the present invention without departing from the underlying principles thereof. The scope of the present invention should, therefore, be determined only by the following claims.

I claim:

1. A method for improving the firmness of an intact piece of fish tissue from a soft-textured fish having poor structural integrity, comprising:

coating a piece of soft-textured fish tissue with a powdered material;

providing a high-temperature surface; and directly contacting the soft-textured fish tissue, coated with the powdered binding material, against the high-temperature surface at a temperature and for a time sufficient to substantially inactivate protease enzymes which may be present in the soft-textured fish tissue and to introduced a sufficient amount of heat into the soft-textured fish tissue to significantly increase the structural integrity of the soft-textured fish tissue.

2. The method of claim 1 in which the powdered binding material comprises whey protein concentrate.

3. The method of claim 2 further comprising:

treating the soft-textured fish tissue with a phosphate solution prior to coating the piece of soft-textured fish tissue with the powdered binding material.

4. The method of claim 3 in which the step of treating the fish tissue with a phosphate solution further comprises soaking the fish tissue in an STPP solution for 1–15 minutes prior to the step of applying the powdered binding material.

5. The method of claim 4 in which the high temperature is within the range of 145°–400°C.

6. The method of claim 5 in which the soft-textured fish tissue contact the high temperature surface for 40–180 seconds.

7. The method of claim 14 in which the soft-textured fish is a whiting.

8. The method of claim 6 in which the intact piece of soft-textured fish tissue is a steak or a fillet.

9. The method of claim 2 in which the high temperature is within the range of 145°–400° C.

10. The method of claim 9 in which the high temperature is within the range of 175°–300° C.

11. The method of claim 2 in which the soft-textured fish tissue contact the high temperature surface for 40–180 seconds.

12. The method of claim 1 in which the powdered binding material includes proteins, high-protein dairy derivatives, starches, or gelatinous or carbohydrate hydrocolloid-type binding materials.

13. The method of claim 1 in which the step of applying the powdered binding material comprises dusting exposed soft-textured fish tissue with the powdered binding material.

14. The method of claim 1 further comprising:

treating the soft-textured fish tissue with a phosphate solution prior to coating the piece of soft-textured fish tissue with the powdered binding material.

15. The method of claim 14 in which the step of treating the soft-textured fish tissue with a phosphate solution further comprises soaking the soft-textured fish tissue in an STPP solution for 1–15 minutes prior to the step of applying the powdered binding material.

16. The method of claim 1 in which the high temperature is within the range of 145°–400° C.

17. The method of claim 1 in which the soft-textured fish tissue contacts the high temperature surface for 40–180 seconds.

18. The method of claim 1 in which the soft-textured fish tissue includes protease enzymes.

19. The method of claim 1 in which the soft-textured fish is a whiting.

20. The method of claim 19 in which the whiting is a Pacific Whiting, an Argentine Whiting, a Chilean Whiting, an Atlantic Whiting, or a Peruvian Whiting.

21. The method of claim 19 in which the intact piece of soft-textured fish tissue is a steak or a fillet.

22. The method of claim 1 in which the soft-textured fish is an Arrowtooth Flounder, Pacific Dover Sole, a Pacific Sand Dab, a Pacific Mackerel, or an English Sole.

23. The method of claim 22 in which the intact piece of soft-textured fish tissue is a steak or a fillet.

24. The method of claim 1 in which the intact piece of soft-textured fish tissue is a steak or a fillet.

* * * * *